Feb. 17, 1953 V. J. ALBANO 2,628,936

METHOD OF FORMING A POINT AT THE END OF A WIRE

Filed May 6, 1949 2 SHEETS—SHEET 1

INVENTOR
V. J. ALBANO
BY

ATTORNEY

Feb. 17, 1953 V. J. ALBANO 2,628,936

METHOD OF FORMING A POINT AT THE END OF A WIRE

Filed May 6, 1949 2 SHEETS—SHEET 2

INVENTOR
V. J. ALBANO
BY
ATTORNEY

Patented Feb. 17, 1953 2,628,936

UNITED STATES PATENT OFFICE 2,628,936

METHOD OF FORMING A POINT AT THE END OF A WIRE

Vincent J. Albano, Fanwood, N. J., assignor to Bell Telephone Laboratories, Incorporated, New York, N. Y., a corporation of New York Application May 6, 1949, Serial No. 91,699

6 Claims. (Cl. 204—142)

This invention relates to methods of producing a taper on thin members such as the ends of wires or the edges of blades. More particularly it relates to methods involving the use of an etchant for pointing contact members for translating devices such as crystal rectifiers and detectors.

In translating devices of the type above indicated, the operating characteristics are markedly dependent upon the area of the junction between the point contact and the crystal body. This area in turn is determined by or dependent upon the taper of the point.

Point contacts for translating devices have been produced heretofore by methods involving the corrosion of the contact material. Illustrative of such methods is that disclosed in Patent 2,434,286, issued January 13, 1948, to W. G. Pfann.

One general object of this invention is to improve methods of tapering metallic bodies. More specifically, objects of this invention are to facilitate the realization of prescribed configurations of the taper, to stabilize the surface of the etchant medium, and to simplify the apparatus for the tapering of metallic members such as contact points.

It may be noted that the term "etchant" as herein employed includes fluids which are chemically corrosive as to the material of the member being tapered as well as those which corrode the material only when it is made anodic in the solution by the application of electrical energy.

It has been found that the configuration of the tapered portion of the member can be determined by controlling the configuration of the meniscus in the solution in which the member is corroded.

In accordance with one feature of this invention, a body of liquid is floated upon the surface of the etchant into which the body to be tapered is inserted, the floated liquid serving to control the shape of the meniscus at the junction of the etchant and the member, thereby to determine the configuration of the tapered portion of the member. In addition, the floated liquid serves to stabilize the surface of the etchant thereby to prevent impairment of the meniscus between the etchant and the body being formed. Furthermore, the added liquid reduces turbulence adjacent the body being formed, such as results from evolution of gases in the etchant during the process. This, in the case of electrolytic action, enables the use of higher currents through the etchant and consequently results in a substantial reduction in the period requisite for the formation of the desired taper or point.

The invention and the above-noted and other features thereof will be understood more clearly and fully from the following detailed description with reference to the accompanying drawings in which.

Figure 1:
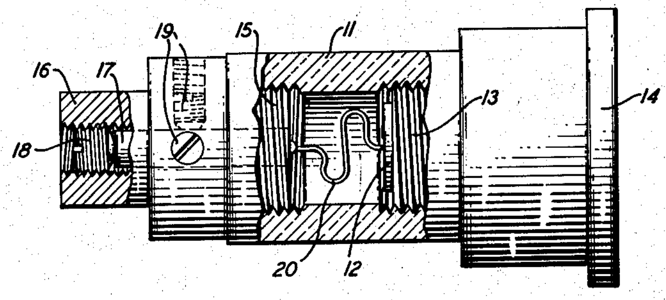
Fig. 1 is a view partially in section of a signal translating device including a point contact formed in accordance with this invention.

An assembled translating unit of the point contact type employing a contact produced in accordance with this invention is disclosed in Fig. 1. A ceramic insulating cylinder 11 forms a supporting body which is internally threaded to receive a point contact assembly, and an assembly supporting a rectifying wafer 12. The wafer 12 which may be of some material having the desired rectifying properties, such as silicon or germanium, is secured in good conductive relationship therewith, to the top of the threaded stud 13 which is integral with the base member 14. This stud is mounted in the ceramic cylinder 11 by being screwed into one end of the bore of the cylinder. In like manner the threaded stud 15, which is integral with the metallic cap 16 screws into the opposite end of the cylinder 11. The cap member 16 contains a central bore extending through the stud 15 for receiving a cylindrical metallic contact holder 17. This holder is adjustable within the bore by turning the threaded plug 18 until the pointed end of the contact wire 20, the opposite end of which is soldered in the holder 17, makes contact with the rectifying wafer 12. When the desired force has been applied to the contact between the point and the wafer surface, the set screws 19 are tightened to seize the holder 17 and fix the position of the contact.

A point contact for rectifying devices of the above type is prepared by soldering a piece of wire, for example of the order of .005 inch in diameter, and longer than the desired length of the finish contact wire, in an axial bore in the holder 17. The wire is then given the S shape shown in Fig. 1 to give it resiliency and is then processed to form the contact point.

One pointing process in accordance with this invention is accomplished by an electrolytic etching operation. The initial step in etching the point is the mounting of one or more of the contact holders 17 supporting the formed wires 20 in a rack 21 which comprises two strips each containing a series of cooperating semicircular grooves which receive and support the contact holders when the strips are secured together as disclosed in Fig. 6. The surface of the etchant 23 is then brought up to the proper level in the container 24 so that the ends 25 of all the wires 20 are immersed therein. A layer of liquid which floats on the surface of the electrolyte contacts the wires and by its adhesion to them and to the electrolyte anchors the latter to them and controls the shape of the etchant surface as will be described hereinafter. The etchant may be introduced by a pump, syphon or any other similar liquid transferring means, the liquid being supplied from a reservoir.

Figure 6:
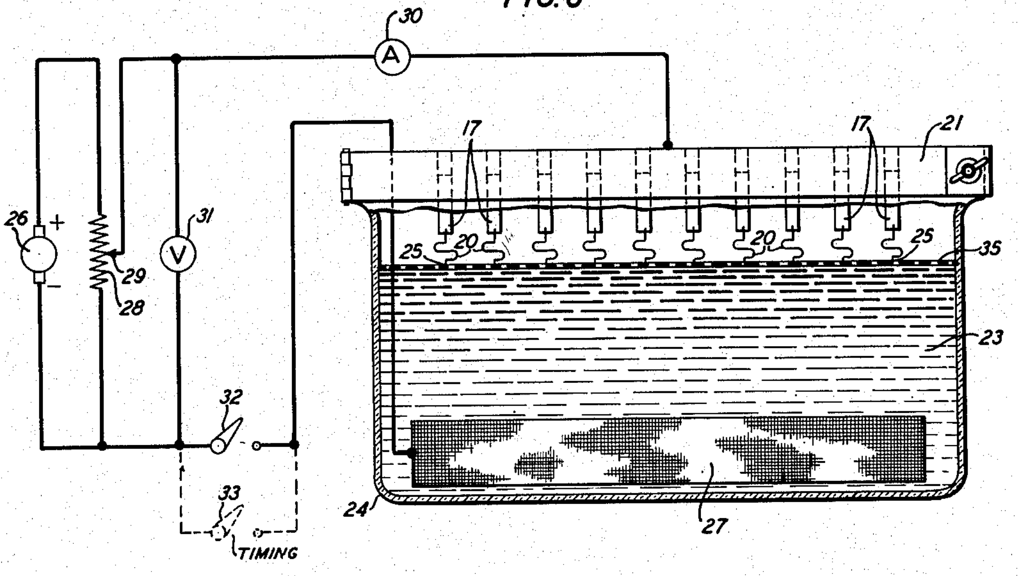
Fig. 6 illustrates an electrolytic apparatus for etching the contact wires.

The apparatus in Fig. 6 is arranged for electrolytic etching and therefore includes a source of direct current 26, the positive side of which is connected to the metallic holder 21 and thereby to the wires 20, while the negative side is associated with an electrode 27 which may be a piece of copper, platinum or some other good conducting metal.

The form taken by the end of the wire depends upon several factors including the type of wire being etched, the etchant employed, the concentration of the etchant solution, the supernatant liquid employed, the voltage applied when electrolytic etching is employed, the minimum or cut-off current, and the length of time energy is applied to the apparatus, the last three factors being directly interrelated.

When the point is produced by anodically dissolving metal from the wire, the form which it takes, with a given metal and etchant concentration, for a particular potential, is directly related to the minimum or cut-off value to which the current is permitted to decrease. Hence, in order to control the formation of the points, means are provided for adjusting the voltage applied between the holder 21 and the cathode 27 and to remove the applied potential when the current through the electrolyte has reached the predetermined minimum. Therefore, in the setup disclosed in Fig. 6, a source of direct current 26 is shown with its positive terminal connected to the holder 21 through an adjustable voltage divider 28 connected across the source. A tap 29 on the divider permits adjustment of the applied voltage as indicated by the meter 31, and a serially connected ammeter 30 indicates the etching current. The application of etching current to the circuit is controlled by a switch 32 included in the lead from the cathode 27 to the negative terminal of the source 26.

As an example of a typical pointing operation with the above setup, forty 5-mil Phosphor bronze contact wires were pointed in an electrolytic etchant, comprising a 250 gram per liter solution of phosphoric acid having a 3 to 4 millimeter layer of mineral oil on its surface, by applying a 3.5-volt potential until the current decreased to a minimum of 80 milliamperes. The points produced in this process were of a shape approximating that shown in Fig. 4*e*, while the continuation of the process till the current decreased to 60 milliamperes produced flatter points as shown in Fig. 4*f*. The preceding values are to be taken as exemplary only, similar results being attained with other electrolytes or electrolyte concentrations, various supernatant liquids or with the same electrolyte and supernatent liquid by using either a lower applied voltage and a lower minimum current or by using a higher applied voltage in a correspondingly higher minimum current.

A convenient automatic means of controlling the formation of points is applicable to this process since the extent to which the pointing proceeds, in addition to being directly related to the current flowing, is also proportional to the length of time during which the circuit has been energized. Hence, in addition to manual control by the series switch 32 and observation of the ammeter 30, the use of a series switch 33 controlled by an automatic timer (not shown) lends itself to factory production, the sample procedure set forth above then being set to run two minutes to obtain identical results, i. e., in two minutes the current decreases to 80 milliamperes.

Figures 4, 5:
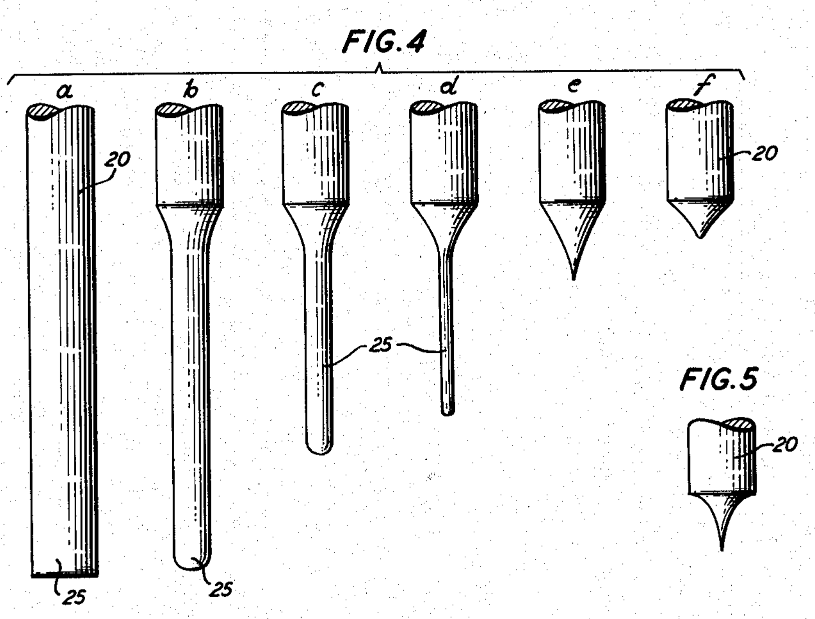
Fig. 4 illustrates a contact wire at different steps in the etching process when produced by an etchant having a surface form adjacent the wire similar to that of Fig. 2.
Fig. 5 shows a contact wire etched under conditions similar to those of Fig. 4 but with an etchant surface shaped as shown in Fig. 3.

The extent of corrosion and its course of progress at several points of time in the etching process are illustrated in Fig. 4. The stages represented include: the wire prior to any etching action (*a*), the wire form after the etching begins and intermediate the time the point is completed (*b*, *c*, and *d*), the point immediately after the end 25 is removed (*e*), and the effect on the point of continuing the etching after the end 25 is removed (*f*).

As an example of a chemical etching process whereby thin metallic edges can be sharpened or wires pointed by utilizing and controlling the varying rate of corrosion which occurs down the submerged member in the region adjacent the etchant surface, 10-mil copper wires have been pointed without the application of external electrical energy by immersion for about five minutes in a solution comprising two parts of concentrated nitric acid, one part of glacial acetic acid, and one part of water maintained at room temperature. The shape of the points thus produced was controlled by controlling the shape of the etchant surface around the point. It was found that a supernatant layer of light mineral oil formed a meniscus shaped similar to that of Fig. 2 and produced a conical point, while a supernatant layer of oleic acid formed a surface configuration in the etchant similar to that shown in Fig. 3 and the resulting point was considerably sharper than that produced with the concave upward meniscus.

When pointing wires from a bath exposed to the atmosphere, the interfacial forces and the force of gravity cause the formation of a meniscus which is concave upward. As corrosion of the submerged end of the wire proceeds, the area of contact between it and the etchant diminishes so that eventually the contact area is reduced to that which exists between the meniscus and the extreme tip of the wire. With this small contact area, the interfacial forces supporting the meniscus become vanishingly small so that extraneous mechanical forces such as vibration of the surface of the solution, may cause the meniscus to break away from the wire. When this happens the tip of the wire may be above the surface of the solution, and it is extremely unlikely that the contact between the wire and the solution will again be established.

To improve the stability of the meniscus, the forces supporting it should persist unabated until the pointing is complete. This can be accomplished by covering the surface of the etchant with a layer of liquid which is lighter than the etchant, which is immiscible and does not react chemically with it, and, when electrolytic etching is employed, is non-conducting and is not oxidized electrolytically. The meniscus of etchant obtained under these conditions may vary from concave upward to concave downward depending on the relative adhesion tension of the etchant and the supernatant liquid for the wire. The meniscus will be concave upward if the adhesion tension of the solution is greater than the adhesion tension of the supernatant liquid as disclosed in Fig. 2 and concave downward when the adhesion tension of the supernatant liquid is greater than that of the solution as disclosed in Fig. 3.

Figure 2:
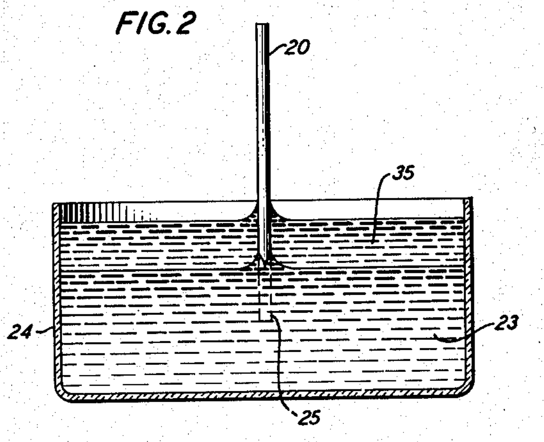
Fig. 2 illustrates the etchant meniscus formed when the adhesion tension of the etchant solution for the member to be tapered is greater than the adhesion tension of the supernatant liquid.
Figure 3:
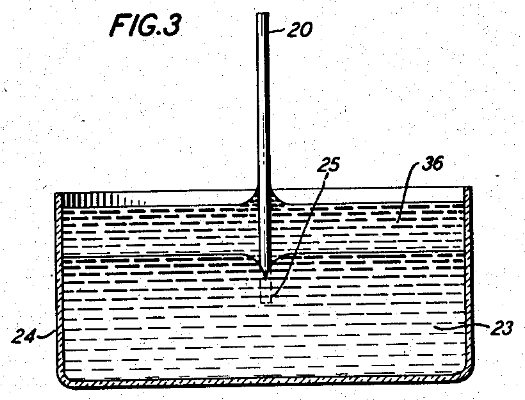
Fig. 3 illustrates the etchant meniscus formed when the adhesion tension of the supernatant liquid for the member to be tapered is greater than the adhesion tension of the etchant solution.

The shape of the etchant meniscus which forms around the wire is a function of the chemical and physical nature of the supernatant liquid and etchant. In general, supernatant liquids having non-polar molecular structures will produce menisci of etchants which are concave upward. Those having polar structures will produce menisci which are concave downward, this being explained by the greater attraction of the polar structures for the wire which results in an adhesion tension which is greater than that of the etchant solution. Fig. 2 shows the effect of a non-polar liquid 35 on the meniscus of the etchant, for example mineral oil floated over phosphoric acid for use in electrolytic pointing of Phosphor bronze wire; it produces a meniscus of the electrolyte which is concave upward. Fig. 3 discloses the effect of a polar liquid 36, for example oleic acid floated over phosphoric acid. With this combination the resulting meniscus is concave downward. By employing etchants and supernatant liquids having relative adhesion tensions for the wire intermediate those disclosed in Figs. 2 and 3, the shape of the meniscus can be altered thus controlling the shape of the point formed by the etching action.

While some control as to the shape of the tapers produced is obtained, as has been indicated heretofore, by selecting the etchant, controlling its concentration, limiting the period of the etch and in the case of the electrolytic etching processes controlling the electrical parameters, a further control is available when a supernatant liquid is employed. To illustrate this control when the heretofore enumerated parameters are fixed, the shape of the tapers can be controlled by changing the shape of the etching surface surrounding the object to be etched. Figs. 4*f* and 5 disclose the effect of surface shape on the shape of the taper where other parameters are fixed. The taper shown in Fig. 4*f* was produced by an etchant having a surface shape similar to that of Fig. 2, while the taper shown in Fig. 5 was produced in an etchant having a surface shape similar to that of Fig. 3. Tapers intermediate those of Figs. 4*f* and 5 can be produced by surface shapes intermediate those of Figs. 2 and 3. While the effect of the etchant surface shape is disclosed only with fixed parameters, it is to be understood that in manufacturing points or edges a combination of controls would be employed with surface shape to obtain the desired taper.

The stability of the etchant meniscus is improved by the use of the supernatant liquid since it introduces new interfacial forces for supporting the meniscus, namely: the adhesion between it and the wire and the adhesion between it and the etchant. Since the area of contact between the supernatant liquid and wire, and between the supernatant liquid and etchant does not diminish as pointing proceeds, the interfacial forces supporting the etchant meniscus will not diminish either and will persist to the very end of the pointing process. In this way, dislodgment of the pointing meniscus is prevented. In effect, the meniscus is moored to the tip of the wire by the supernatant liquid above it.

The improvement in meniscus stability imparted by the use of a polar supernatant liquid is greater than that imparted by non-polar liquids since with a meniscus which is concave downward the tip of the wire is actually below the true level of the etchant. Under these conditions the meniscus would inevitably reestablish itself if it should be momentarily dislodged by a sudden shock.

The stabilizing effect of the supernatant liquid improves as the thickness of the layer increases, but beyond a certain thickness the increase in improvement is negligibly small. The minimum thickness for satisfactory results appears to be a function of the diameter of the wire being pointed, and the current density at which the operation is being performed. For example when pointing 5-mil Phosphor bronze wires, it has been found desirable to have a supernatant layer having a thickness of at least 1 millimeter and preferably 3 to 4 millimeters thick when using a light mineral oil.

The stabilizing effect of the supernatant liquid has permitted the use of higher current densities and therefore considerably shorter etching periods since the resulting gassing in the electrolyte does not so agitate it that the meniscus breaks away from the wire. The gassing effect, however, must be considered in choosing the supernatant liquid since it should not be so viscous that it impedes the escape of the gas bubbles when they reach the interface between the electrolyte and the upper liquid. Bubbles which cling to the wire at or below this interface distort the shape of the meniscus and thereby interfere with satisfactory point formation. An advantageous feature of non-polar liquids is the fact that they promote the liberation of oxygen from the solution in the form of fine bubbles which have little tendency to cling to the wire and, therefore, have no disturbing effect on the meniscus.

While no mention in the preceding specification has been made of supernatant liquids, other than light mineral oil and oleic acid, it is not intended that the supernatant liquids employed with the various etchants should be limited to those two compounds. Successful points have been made with various grades of mineral oil, kerosene, a liquid silicone, hexane, benzol, xylene, cyclohexane and various mixtures of these liquids.

What is claimed is:

1. The method of sharpening a metallic member by etching which comprises mounting said member with a portion thereof external of an etching bath and another portion extending through the surface of and into the bath, floating a layer of liquid which is immiscible with the etchant and is chemically inert to the etchant on the surface of the etching bath to control the shape of the interface between the etching bath and the liquid where the member penetrates it and partially dissolving that portion of the member which is immersed in the etching bath and is immediately below said interface.

2. The method of forming a point on the end of a wire by etching which comprises mounting the wire with a portion thereof external of an etching bath and one end thereof extending through the surface of and into the bath, floating a layer of liquid on the surface of the etching bath to control the shape of the interface between the etching bath and the liquid around the wire at its point of penetration into the etching bath, said liquid being immiscible with and chemically inert to the etchant, and partially dissolving that portion of the wire in the bath immediately below the interface between the bath and the liquid to form a point on the wire.

3. The method of sharpening a metallic member by electrolytic etching which comprises mounting said member with a portion thereof external of an electrolyte and another portion extending through the surface of and into the electrolyte, floating a layer of liquid which is immiscible with and chemically inert to the electrolyte and which is non-conducting on the surface of the electrolyte to control the shape of the interface between the electrolyte and the liquid around the member at the point it penetrates the interface, and passing current through the member connected as an anode, the electrolyte, and a cathode in the electrolyte to partially dissolve that portion of the member in the electrolyte immediately below the interface and to form a symmetrical taper on said member.

4. The method of pointing the end of a wire by electrolytic etching which comprises mounting the wire with a portion thereof external of an electrolyte and one end thereof extending through the surface of and into the electrolyte, floating a layer of liquid on the surface of the electrolyte to control the shape of the interface between the electrolyte and the liquid around the wire at its point of penetration into the electrolyte, said supernatant liquid being immiscible with and chemically inert to the etchant and being non-conducting, and passing current through the wire connected as an anode, the electrolyte, and a cathode in the electrolyte to partially dissolve that portion of the wire in the electrolyte immediately below the interface to form a point on said wire.

5. The method of pointing an electrical contact wire by electrolytic etching which comprises mounting the wire with a portion thereof external of an electrolyte and one end thereof extending through the surface of and into the electrolyte, floating a layer of non-polar liquid which is non-conductive, immiscible with and chemically inert to the electrolyte and which adheres to said wire on the surface of said electrolyte, the degree of adhesion of the non-polar liquid to the wire determining the shape of the electrolyte meniscus around the wire at its point of penetration into the electrolyte and determining the rate of etching in the electrolyte immediately below the interface between the electrolyte and the non-polar liquid, and passing a current through the wire connected as an anode, the electrolyte, and a cathode in the electrolyte to partially etch that portion of the wire in the electrolyte immediately below the interface.

6. The method of pointing a Phosphor bronze electrical contact wire by electrolytic etching which comprises mounting the wire with a portion thereof external of an electrolytic solution of phosphoric acid and one end thereof extending through the surface of and into the electrolytic solution, floating a layer of light mineral oil which is non-conductive, and immiscible with and chemically inert to the electrolytic solution, the degree of adhesion of the light mineral oil to the wire determining the shape of the meniscus in the electrolytic solution around the wire at its point of penetration into the electrolytic solution and determining the rate of etching in the electrolytic solution immediately below the interface between the electrolytic solution and the light mineral oil, and passing current through the wire connected as an anode, the electrolytic solution, and a cathode in the electrolytic solution to partially etch that portion of the wire in the electrolytic solution immediately below the interface.

VINCENT J. ALBANO.

REFERENCES CITED

The following references are of record in the file of this patent:

UNITED STATES PATENTS

| Number | Name | Date |
|---|---|---|
| 2,115,005 | Blaut et al. | Apr. 26, 1938 |
| 2,434,286 | Pfann | Jan. 13, 1948 |

OTHER REFERENCES

"The Physics and Chemistry of Surfaces," by Adams, 3rd edition (1941), Oxford University Press, pages 188, 189.